United States Patent
Raassina et al.

(10) Patent No.: US 10,855,071 B2
(45) Date of Patent: Dec. 1, 2020

(54) MOTOR DRIVE

(71) Applicant: Kone Corporation, Helsinki (FI)

(72) Inventors: Pasi Raassina, Helsinki (FI);
Juhamatti Nikander, Helsinki (FI);
Pasi Rinnesaari, Helsinki (FI);
Ari-Pekka Lahtinen, Helsinki (FI);
Arto Nakari, Hyvinkaa (FI); Olli Pokkinen, Helsinki (FI)

(73) Assignee: Kone Corporation, Helsinki (FI)

( * ) Notice: Subject to any disclaimer, the term of this patent is extended or adjusted under 35 U.S.C. 154(b) by 578 days.

(21) Appl. No.: 15/643,786

(22) Filed: Jul. 7, 2017

(65) Prior Publication Data
US 2018/0090925 A1    Mar. 29, 2018

(30) Foreign Application Priority Data

Sep. 26, 2016 (EP) .................................... 16190669

(51) Int. Cl.
*H02H 7/08* (2006.01)
*H02M 5/458* (2006.01)
(Continued)

(52) U.S. Cl.
CPC ............ *H02H 7/0833* (2013.01); *B66B 1/30* (2013.01); *B66B 5/0031* (2013.01); *B66B 9/00* (2013.01);
(Continued)

(58) Field of Classification Search
CPC ...... H02H 7/0833; B66B 1/30; B66B 5/0031; B66B 9/00; B66B 11/043
(Continued)

(56) References Cited

U.S. PATENT DOCUMENTS 4,893,479 A * 1/1990 Gillett .................. F25B 49/025
                                                             318/806
4,912,382 A * 3/1990 Koenig .................... G05B 9/02
                                                             318/563
(Continued)

FOREIGN PATENT DOCUMENTS

EP        0571657 A2    12/1993
EP        1494343 A2     1/2005
WO     WO-2014/068194 A1  5/2014

OTHER PUBLICATIONS

Extended European Search Report—EP 16190669 dated May 16, 2017.

*Primary Examiner* — David S Warren
(74) *Attorney, Agent, or Firm* — Harness, Dickey & Pierce, P.L.C.

(57) ABSTRACT

A motor drive includes a rectifier bridge for connection with mains, a converter bridge configured to connect with an elevator motor and an intermediate DC circuit in-between. A capacitor and/or battery is connected between positive and negative branches of the intermediate DC circuit. At the mains side of the rectifier bridge a controlled main relay with contacts are configured to connect or disconnect the rectifier bridge with the corresponding mains phase. The motor drive comprises a charging circuit which comprises a charging switch connected with a current limiting component. The motor drive comprises a voltage sensor between positive and negative branches of the intermediate DC circuit. The voltage sensor is connected to a circuit comprising a reference value and a comparator. The evaluation circuit is configured to compare the actual sensor signal of the voltage sensor to the reference value and to operate the main relay based on the comparison.

14 Claims, 3 Drawing Sheets

(51) Int. Cl.
  *H02H 1/00* (2006.01)
  *H02P 27/06* (2006.01)
  *B66B 9/00* (2006.01)
  *B66B 5/00* (2006.01)
  *B66B 11/04* (2006.01)
  *B66B 1/30* (2006.01)
  *H02H 7/09* (2006.01)
  *H02H 7/12* (2006.01)

(52) U.S. Cl.
  CPC ......... *B66B 11/043* (2013.01); *H02H 1/0007* (2013.01); *H02H 7/09* (2013.01); *H02M 5/4585* (2013.01); *H02P 27/06* (2013.01); *H02H 7/1216* (2013.01)

(58) Field of Classification Search
  USPC .......................................................... 187/289
  See application file for complete search history.

(56) References Cited

U.S. PATENT DOCUMENTS

| | | | | |
|---|---|---|---|---|
| 5,123,080 | A * | 6/1992 | Gillett | F25B 49/025 318/806 |
| 6,268,707 | B1 * | 7/2001 | Decottignies | B60L 7/04 318/65 |
| 8,299,732 | B2 * | 10/2012 | Hoadley | H02M 5/14 318/105 |
| 8,403,112 | B2 * | 3/2013 | Bonanno | E04G 3/32 187/296 |
| 8,733,509 | B2 * | 5/2014 | Bonanno | E04G 3/32 187/296 |
| 2010/0078998 | A1 | 4/2010 | Wei et al. | |
| 2010/0079093 | A1 * | 4/2010 | Kitanaka | B60L 3/003 318/400.3 |
| 2010/0176755 | A1 * | 7/2010 | Hoadley | H02M 5/14 318/105 |
| 2014/0021898 | A1 * | 1/2014 | Hendrickson | H02P 29/028 318/434 |
| 2014/0139167 | A1 * | 5/2014 | Steimer | H02M 1/126 318/494 |
| 2015/0180400 | A1 | 6/2015 | Bober | |
| 2016/0059711 | A1 * | 3/2016 | Holmes | H02P 5/74 318/51 |
| 2018/0327215 | A1 * | 11/2018 | Kattainen | B66B 1/308 |

* cited by examiner

MOTOR DRIVE

This application claims priority to European Patent Application No. EP16190669.8 filed on Sep. 26, 2016, the entire contents of which are incorporated herein by reference.

Figure 2:
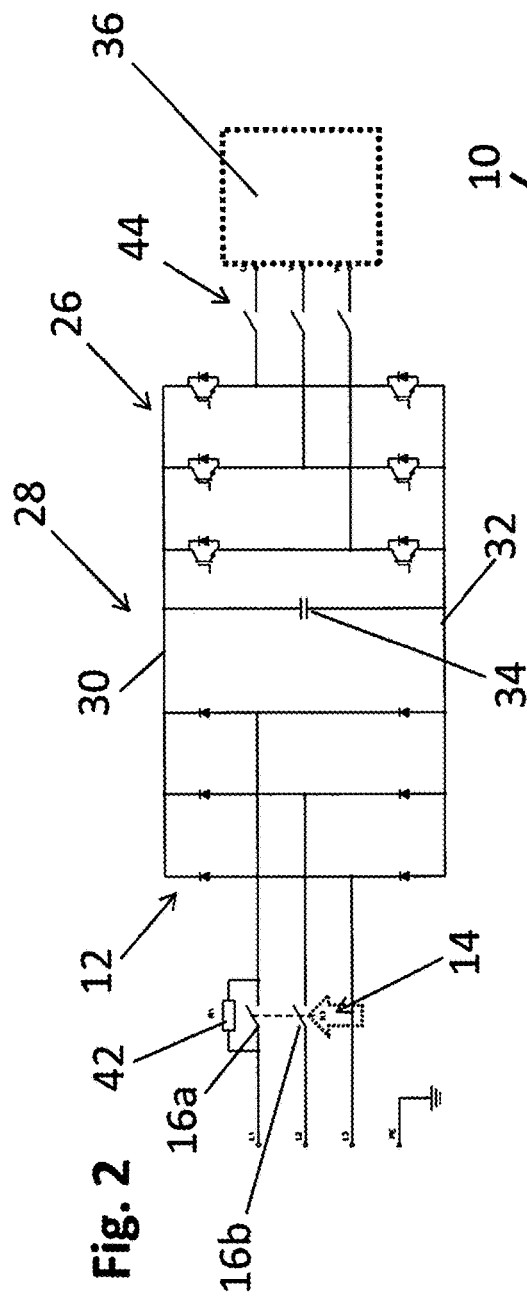

The present invention refers to a motor drive which enables motor earth fault protection in an economical way. A motor earth fault happens if one or more motor outputs are connected to ground. Such an earth fault should be detected to prevent excessive currents flowing and breaking any components of the motor drive. The possibility of a ground fault during operation of the motor drive is quite low but most likely earth faults happen during installation when the power is cut. Therefore, in most cases it would be sufficient to detect the ground fault situation when the mains supply is connected and then to prevent the flow of ground fault current by using some switching elements. FIG. 2 of this application shows an internally known solution for preventing earth fault current flowing in such situations. In the known solution, the motor drive comprises a rectifier bridge, i.e. an active semiconductor bridge or a passive diode bridge, which is connected to mains via a main relay or contactors. On the motor side there is a converter bridge with active semiconductor switches which converter bridge is connected with switching elements, such as a motor relay, to the elevator motor. Between the rectifier bridge and the converter bridge, there is an intermediate DC circuit comprising a capacitor or battery. If there is an earth short circuit of the motor, it does not prevent the charging of the intermediate DC circuit because the motor relay in the motor side is open. After the intermediate DC circuit or DC link is being charged, the motor relay is closed when the drive sequence is starting due to the operation of the elevator. When the semiconductor switches of the converter bridge are switched on, a desaturation detection circuit will trip and protect the converter from earth fault current. Anyway, if the motor relay between the converter and the elevator motor would not be existing there would be significant current flowing through the antiparallel diodes of the IGBT transistors of the converter bridge and the capacitor accumulator of the intermediate DC circuit. This current can reach several hundreds of amperes before the capacitor is charged which destroys the IGBT parallel diodes. Therefore, on this behalf the provision of high current contactors between the converter bridge and the elevator motor is essential, but expensive.

The EP 571 657 A2 discloses a motor drive as specified above comprising a charging circuit which is connected in parallel to the main contactors between mains and the rectifier bridge. This allows charging of the capacitor in the intermediate circuit.

However this allows reliable charging and earth fault detection only when the rectifier bridge is controlled to be working or when a conventional diode bridge is used as a rectifier.

It is therefore object of the present invention to enable earth fault detection and the prevention of high fault currents in an economical way.

The object of the invention is solved with a motor drive according to claim 1. Preferred embodiments of the invention are subject-matter of the dependent claims. Advantageous embodiments of the invention are also described in the specification as well as in the drawings.

The inventive motor drive comprises a rectifier bridge for connection with mains, a converter bridge configured to be connected with an elevator motor and an intermediate DC circuit in-between, whereby between a positive and a negative branch of the intermediate DC circuit at least one capacitor and/or battery is connected. At the mains side of the rectifier bridge, a controlled main relay is arranged, comprising for each of at least two mains phases a switch, which is configured to connect or disconnect the rectifier bridge with/from the corresponding mains phase. According to the invention, the motor drive comprises a charging circuit being connected between the mains on one hand and the intermediate DC circuit on the other hand. The charging circuit comprises at least one charging switch which connected in series with at least one current limiting component. The motor drive further comprises a voltage sensor connected between the positive and the negative branch of the intermediate DC circuit, which voltage sensor is connected to a fault evaluation circuit comprising a memory for at least one reference value and a comparator, which evaluation circuit is configured compare the actual sensor signal of the voltage measuring circuit with the reference value and to operate the main relay dependent on the comparison result. On the other hand, in a ground fault situation it is also possible that the DC link voltage may not be charged but remains too low for the evaluation circuit (microprocessor inside the motor drive) to wake up, thus preventing closing of the main relay.

According to the invention, the charging circuit bypasses the rectifier bridge and is directly connected with the intermediate DC circuit, of course via corresponding diodes or other voltage rectifying components. Also in this case, the current flow over current limiting component and/or the voltage in the intermediate DC circuit can be used as a signal to prevent closing of the main relay and also to open the charging switch again to prevent damaging of the current limiting component. The current limiting component can be e.g. a normal resistor, a varistor or a PTC resistor.

According to the invention, there is an additional charging switch which is used as initial connection to the mains supply before the main relay is switched on. By measuring the voltage with the voltage sensor when only the charging switch is closed it can be evaluated whether or not an earth current fault is present. If this is the case the closing of the main relay can be prevented. On this behalf the voltage sensor is connected with an evaluation circuit which is either part of the motor drive or part of the elevator control. This evaluation circuit compares the voltage measured in the intermediate DC circuit with at least one reference value, which also can also be zero. If the reference value is exceeded by a threshold value an emergency signal and/or process is issued/initiated. This of course includes preventing the closing of the main relay and possibly also the opening of the charging switch in order to protect the current limiting component.

An essential advantage of the invention is the fact that no motor relay is necessary which comprises quite expensive high current switches. It follows that the inventive motor drive does not comprise any switch between the converter bridge and the elevator motor. This means that the connection between the converter bridge and the motor is direct, permanent, respectively un-interrupted.

Another possibility of detecting the earth fault is to monitor the current flowing over the current limiting component, e.g. by measuring the voltage over said component. This solution is preferably advantageous if a PTC resistor is used as a current limiting component. When an earth fault happens, the current over the current limiting component gets too high in which case the evaluation circuit located in a microcontroller of the motor drive or in the elevator control prevents the closing of the relay contacts. If PTC resistors are running overcurrent, their resistance goes up as they heat up in course of excessive current flow which then leads to a current drop and thus to the prevention of a damage of the PTC-resistor. Also in this case, the voltage drop over the current limiting component could be used as a signal for preventing the main relay from being closed.

Preferably, the charging circuit is connected in parallel to one or two of the contactors. Via this measure a current path between two phases of mains and the rectifier bridge via the current limiting component is obtained so that a capacitor or battery in the intermediate DC circuit can be charged before closing the main relay.

This solution can be realized with comparably small and cheap electronic components. No high power components are required.

In a preferred embodiment of the invention, the main relay is configured to be controlled by an elevator control. In the preferred embodiment, the main relay is not used as a safety component but safety is ensured otherwise (so called drive without main contactors or main relay).

In a preferred embodiment of the invention the evaluation circuit is configured to operate also the charging switch dependent on the comparison result. In this case also the current limiting component of the charging circuit can be prevented from being damaged because of over-current in the case of an earth current fault.

Preferably, the charging switch, which—compared to the main relay or contactors—is a low current switch, is operated by a charging relay which again is controlled by the evaluation circuit in a microprocessor of the motor drive performing the earth fault current test or by in the elevator control. The low currents components are essentially cheaper than the high current contactors on the motor side.

In a preferred embodiment of the invention, the motor drive comprises a voltage sensor connected to the intermediate DC circuit, which voltage sensor is configured to be connected to an evaluation circuit, e.g. located in a microprocessor of the motor drive. The evaluation circuit comprises a memory for at least one voltage reference value and a comparator to compare the voltage sensor signal with the stored reference value and to issue a fault signal dependent on the comparison result or to initiate a fault process as for example opening the charging circuit and preventing the closing of the main relay. Alternatively, the evaluation circuit can be located in connection with the elevator control.

With this solution, earth fault currents of the motor or motor drive can immediately be detected and the connection of the motor drive to mains can be prevented so that essential harm of motor drive components can be prevented effectively.

Preferably, the charging circuit comprises a second current limiting component connected in parallel with a contact of the charging relay or main relay to enable current flow from mains to the DC intermediate circuit.

The invention also comprises an elevator comprising an elevator control, an elevator motor configured to move at least one elevator car and a motor drive for the elevator motor which is controlled by the elevator control. The motor drive corresponds to one of the previous described inventive motor drives. The invention allows the checking of the intermediate DC circuit voltage before and after closing the charging circuit to check the motor drive and motor on the presence of any earth fault current before connecting the main relay. Further, during the charging of the capacitor or battery in the intermediate DC circuit, the voltage over the current limiting component of the charging circuit can be monitored as to detect an earth fault current situation which would lead to an undue current flow which might harm the current limiting component if that current limiting component is not a PTC resistor which is kind of self-protecting.

In a preferred embodiment, the elevator control is connected with a voltage sensor connected to the intermediate DC circuit and the elevator control comprises the evaluation circuit with a memory for at least one voltage reference value and a comparator to compare the actual DC circuit voltage and/or the voltage over the current limiting component of the charging circuit with the at least one stored reference value and to issue a fault signal and/or to initiate a fault preventing process dependent on the comparison result. This monitoring function of the elevator control could also be realized by a microcontroller of the motor drive. The solution allows a reliable and economical earth fault control before the charging circuit is closed as well as during the charging of the capacitor or battery in the intermediate DC circuit before the main relay contacts are closed. Accordingly, with this solution effectively harm can be prevented from any components of the motor drive, particularly the semiconductor switches or the parallel diodes of the semiconductor switches. An essential advantage of the invention is the fact that any contactors or motor relay between the converter bridge and the motor can be omitted.

Therefore, preferably there is no motor relay located between the converter bridge and the elevator motor in the motor drive of the invention. Thus in the inventive elevator the connection between the elevator motor and the converter bridge is preferably direct, permanent and un-interrupted.

The invention also relates to a method for detecting an earth fault of an elevator motor, using a motor drive according to the above description, whereby the elevator motor is permanently connected to the converter bridge of the motor drive. According to the inventive method before closing the main relay, the charging switch of the charging circuit is closed and the voltage of the intermediate DC circuit and/or the voltage over the current limiting component of the charging circuit is measured, and that the main relay is closed only if the measured voltage over the current limiting component is below at least one reference value and/or if the voltage of the intermediate DC circuit exceeds at least one reference value. Regarding the features and advantages of this method it is referred to the above described inventive motor drive.

Preferably already before closing the charging switch the voltage in the intermediate DC circuit is measured and the charging switch is prevented from being closed if the voltage exceeds at least one reference value. By this means a ground fault may be checked already before charging the intermediate DC circuit.

It is clear for the skilled person that the different embodiments of the invention as mentioned above can be combined with each other arbitrarily.

Figure 1:
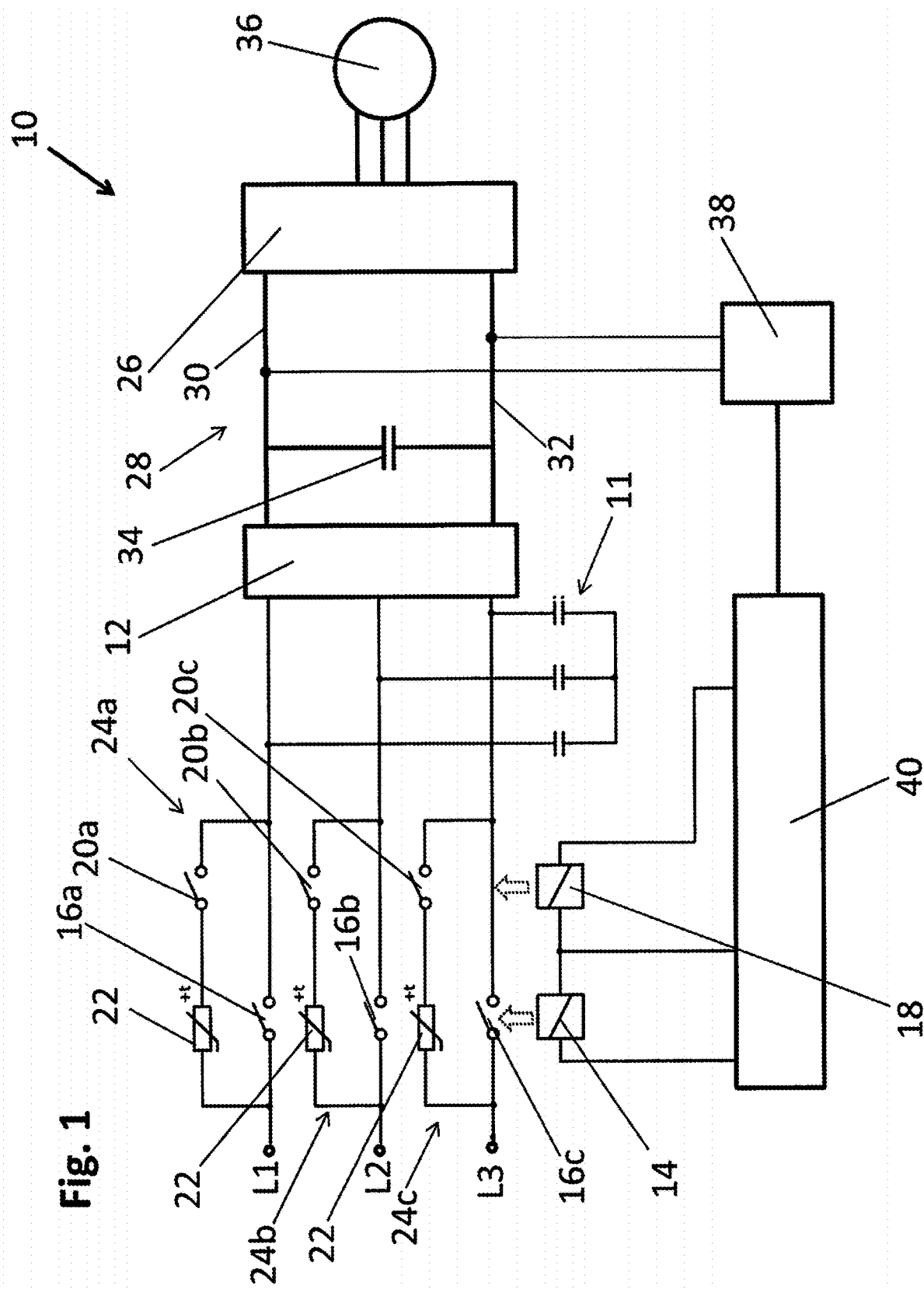
Figure 3:
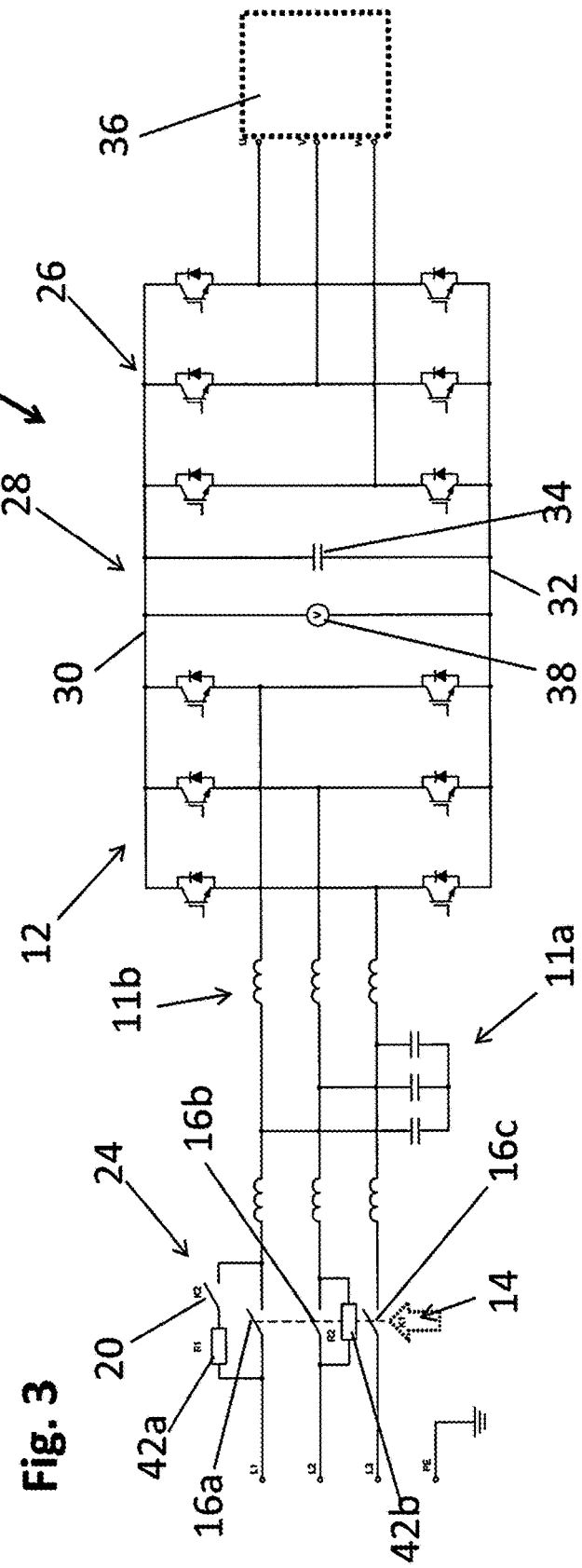
Figure 4:
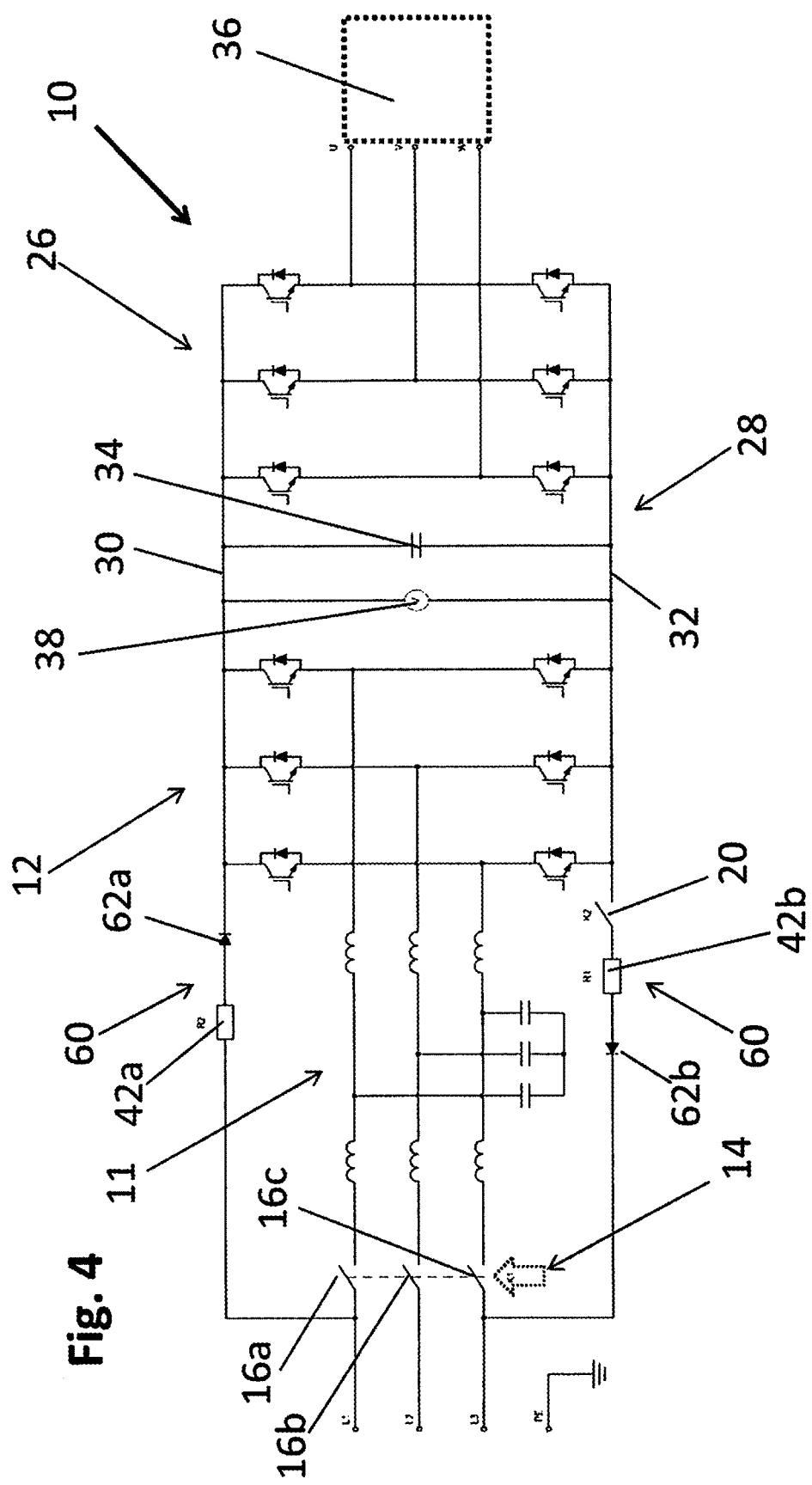

Following terms are used as synonyms in this specification: intermediate DC circuit—DC link; contactor—relay—main relay; contacts—main switches; voltage measuring circuit—voltage sensor; evaluation circuit—fault evaluation circuit;

The invention is hereinafter described with reference to the enclosed drawings. In the drawings:

FIG. 1 shows a schematic diagram of a first solution of a motor drive comprising a fault detection in connection with the charging circuit, which solution is not covered by the invention, FIG. 2 a motor drive according to an internal prior art, FIG. 3 a second solution of a motor drive comprising a charging circuit in connection with an earth fault protection which second solution is not covered by the invention, and FIG. 4 a schematic diagram of an inventive solution of an earth fault protection in connection with the charging circuit for an intermediate DC circuit capacitor or battery.

FIG. 1 shows a motor drive 10 comprising a rectifier bridge 12 which is connected to mains L1, L2, L3 via a main relay 14 with contacts 16a-16c for the mains phases L1-L3, e.g. of a public AC electricity network. Parallel to the main relay 14 a charging relay 18 with charging switches 20a-20c is connected, whereby each charging switch 20a-20c forms a charging circuit 24 together with a PTC resistor 22 as current limiting component in each phase L1-L3.

The rectifier bridge 12 is connected to mains via a smoothing circuit 11 comprising capacitors and/or coils to prevent fault signals of the AC network from harming the rectifier bridge 12.

The rectifier bridge 12 is connected to a converter bridge 26 via an intermediate DC circuit 28 having a positive branch 30 and a negative branch 32 between which a capacitor 34 or battery is connected. The converter bridge 26 is connected to an elevator motor 36 without any contactors or other interrupting components being located in-between. The two branches 30, 32 of the intermediate DC circuit 28 are connected with a voltage sensor 38 which again is connected to an evaluation circuit 40 in the elevator control or in a microprocessor of the motor drive 10.

The invention according to this first embodiment works as follows. Normally, the voltage over the intermediate DC circuit 28 is measured via the voltage sensor 38 before closing the charging circuits 24a to 24c as otherwise the current limiting component of the charging circuit 24 could be destroyed. As in this embodiment, the current limiting component are PTC resistors, an earth fault is not able to destroy the PTC resistor as any case of excessive current leads to a corresponding heating of the PTC resistor and thus the resistance value of the PTC resistor goes up and delimits the current flow. On the other hand, the voltage over the intermediate DC circuit 28 can be measured by the voltage sensor 38 and if the voltage is within predetermined values defined by at least one reference value, e.g. zero, stored in the evaluation circuit 40, the main relay 14 can be activated to close the contactors 16a-16c for the operation of the motor drive. On the other hand, when the voltage over the intermediate DC circuit 28 is not within the limits of the reference value, the closing of the main relay 14 is prevented and also the charging relay 18 may be operated to open the charging switches 20a-20c again. Earth faults can effectively be detected and harmful effects of earth faults on the components of the motor drive can be prevented.

FIG. 2 shows an embodiment of an internal state of the art of the applicant. In all figures, identical or functional similar elements have the same reference numbers. In this known embodiment, the main relay 14 has only contacts 16a, 16b for two phases whereby one of those phases is bypassed via a charging resistor 42. One of the phases L3 is permanently connected to the rectifier bridge 12. On the motor side of the motor drive a motor relay 44 is located between the converter bridge 26 and the elevator motor 36. The charging of the capacitor 34 in the intermediate DC circuit is charged via the charging resistor 42 and in the phases L1 and phase L3. After the capacitor has been charged, the main relay 14 is operated as to close the contacts 16a, 16b. The switches of the motor relay 44 are kept open. If there is an earth fault present, it does not prevent the charging of the capacitor because the motor relay 44 is open. After the capacitor 34 is charged, the motor relay 44 is closed when the drive sequence is starting. When the transistors of the converter bridge 26 are turned on in course of the drive sequence, a desaturating detection circuit will trip and protect the converter bridge from earth fault current by opening the contacts 16a, 16b.

In FIG. 3, the charging circuit 24 with charging switch 28 and two charging resistors 42a, 42b is located in parallel to the contacts 16a, 16b of the main relay 14. Before the charging relay 18 is operated to close the charging switch 20a, the voltage in the intermediate DC circuit is measured via the voltage sensor 38. There should not be any voltage in the intermediate DC circuit before the closing of the charging switch 20 so that if there is any voltage above a threshold value which is quite low, an earth fault seems to have happened. If no voltage is measured, the charging relay 18 is operated as to close the charging switch 20a. If there is no excessive current flow over the charging resistors 42a, 42b, the main relay 14 can be closed.

In the inventive embodiment in FIG. 4, the charging circuit 60 with charging switch 20 and charging resistors 42a, 42b is connected via charging diodes 62a, 62b directly to the intermediate DC circuit 28. Also here, the voltage in the intermediate DC circuit 28 is measured via the voltage sensor 38 before closing the charging switch 20. If during charging the capacitor 34 the voltage in the intermediate DC circuit 28 or over at least one of the charging resistors 42a, 42b does exceed a certain threshold value, the main relay 14 is close the contacts 16a, 16b. Further, even the charging switch 20 could be opened again to prevent damage of the charging resistors 42a, 42b.

The invention is not restricted to the described embodiments but can be modified within the scope of the appended patent claims.

LIST OF REFERENCE NUMBERS 10 motor drive
11 smoothing circuit
12 rectifier bridge
14 main relay
16 contacts of the main relay
18 charging relay
20 charging switch
22 PTC resistor—thermistor
24 charging circuit
26 converter bridge
28 intermediate DC circuit—DC link
30 positive branch of intermediate DC circuit
32 negative branch of intermediate DC circuit
34 capacitor—battery—accumulator—chopper
36 elevator motor
38 voltage sensor
40 evaluation circuit in a microprocessor of the motor drive/in the elevator control
42 resistor of charging circuit
44 motor relay
60 charging circuit
62 charging diode

The invention claimed is:
1. A motor drive, comprising:
a rectifier bridge for connection with mains;
a converter bridge configured to be connected with, and in-between, an elevator motor and an intermediate DC circuit, whereby between a positive and a negative branch of the intermediate DC circuit at least one capacitor and/or battery is connected;

a controlled main relay with contacts at a mains side of the rectifier bridge, the controlled main relay with contacts configured to connect or disconnect the rectifier bridge with a corresponding mains phase;

a smoothing circuit connected between the controlled main relay and the rectifier bridge, the smoothing circuit configured to remove fault signals in AC power supplied from the controlled main relay to the rectifier bridge to prevent the fault signals in the AC power from harming the rectifier bridge;

a charging circuit, the charging circuit including at least one charging switch connected in series with at least one current limiting component; and a voltage sensor connected between the positive and the negative branch of the intermediate DC circuit, the voltage sensor further connected to a fault evaluation circuit that includes a memory storing at least one reference value and a comparator, the fault evaluation circuit configured to detect an earth fault of the elevator motor, the fault evaluation circuit further configured to compare an actual sensor signal of the voltage sensor to the at least one reference value and to operate the controlled main relay based on a result of the comparing, wherein the charging circuit is connected between the mains and the intermediate DC circuit bypassing the rectifier bridge.

2. Motor drive according to claim 1, wherein the current limiting component is a PTC resistor.

3. Motor drive according to claim 1, wherein the controlled main relay is configured to be controlled by an elevator control.

4. Motor drive according to claim 1, wherein the at least one charging switch is operated by a charging relay.

5. Motor drive according to claim 4, wherein the fault evaluation circuit is part of an elevator control or of a microprocessor circuit of the motor drive.

6. Motor drive according to claim 1, wherein the fault evaluation circuit is configured to operate also a charging switch based on the result of the comparing.

7. Motor drive according to claim 1, wherein the memory of the fault evaluation circuit stores at least one voltage reference value as the at least one reference value, and the comparator is configured to issue a fault signal or initiate a fault action dependent on the result of the comparing.

8. A motor drive, comprising:
a rectifier bridge for connection with mains;
a converter bridge configured to be connected with, and in-between, an elevator motor and an intermediate DC circuit, whereby between a positive and a negative branch of the intermediate DC circuit at least one capacitor and/or battery is connected;
a controlled main relay with contacts at a mains side of the rectifier bridge, the controlled main relay with contacts configured to connect or disconnect the rectifier bridge with a corresponding mains phase;
a charging circuit, the charging circuit including at least one charging switch connected in series with at least one current limiting component; and
a voltage sensor connected between the positive and the negative branch of the intermediate DC circuit, the voltage sensor further connected to a fault evaluation circuit that includes a memory storing at least one reference value and a comparator, the fault evaluation circuit configured to detect an earth fault of the elevator motor, the fault evaluation circuit further configured to compare an actual sensor signal of the voltage sensor to the at least one reference value and to operate the controlled main relay based on a result of the comparing, wherein the charging circuit is connected between the mains and the intermediate DC circuit bypassing the rectifier bridge, wherein the charging circuit is connected in parallel to at least one of the contacts.

9. A motor drive, comprising:
a rectifier bridge for connection with mains;
a converter bridge configured to be connected with, and in-between, an elevator motor and an intermediate DC circuit, whereby between a positive and a negative branch of the intermediate DC circuit at least one capacitor and/or battery is connected;
a controlled main relay with contacts at a mains side of the rectifier bridge, the controlled main relay with contacts configured to connect or disconnect the rectifier bridge with a corresponding mains phase;
a charging circuit, the charging circuit including at least one charging switch connected in series with at least one current limiting component; and
a voltage sensor connected between the positive and the negative branch of the intermediate DC circuit, the voltage sensor further connected to a fault evaluation circuit that includes a memory storing at least one reference value and a comparator, the fault evaluation circuit configured to detect an earth fault of the elevator motor, the fault evaluation circuit further configured to compare an actual sensor signal of the voltage sensor to the at least one reference value and to operate the controlled main relay based on a result of the comparing, wherein the charging circuit is connected between the mains and the intermediate DC circuit bypassing the rectifier bridge, wherein the charging circuit comprises a second current limiting component connected in parallel with at least one contact of a charging relay or main relay.

10. Elevator comprising an elevator control, an elevator motor configured to move at least one elevator car and a motor drive for the elevator motor which is controlled by the elevator control, wherein the motor drive is the motor drive according to claim 1.

11. Elevator according to claim 10, wherein the memory stores a voltage reference value as the at least one reference value, and the comparator is configured to compare an actual DC circuit voltage with the at least one reference value and to issue a fault signal and/or initiate a fault preventing process dependent on a result of the comparing of the actual DC circuit voltage with the at least one reference value.

12. Elevator according to claim 10, wherein a connection between the converter bridge and the elevator motor is direct, permanent, respectively un-interrupted.

13. Method for detecting an earth fault of an elevator motor, using a motor drive that includes a rectifier bridge for connection with mains, the motor drive further including a converter bridge configured to be connected with, and in-between, the elevator motor and an intermediate DC circuit, whereby between a positive and a negative branch of the intermediate DC circuit at least one capacitor and/or battery is connected, the motor drive further including a controlled main relay with contacts at a mains side of the rectifier bridge, the controlled main relay with contacts configured to connect or disconnect the rectifier bridge with a corresponding mains phase, the motor drive further including a charging circuit, the charging circuit including at least one charging switch connected in series with at least one current limiting component, the motor drive further including a voltage sensor connected between the positive and the negative branch of the intermediate DC circuit, the voltage sensor further connected to a fault evaluation circuit that includes a memory storing at least one reference value and a comparator, the fault evaluation circuit configured to detect the earth fault of the elevator motor, the fault evaluation circuit further configured to compare an actual sensor signal of the voltage sensor to the at least one reference value and to operate the controlled main relay based on a result of the comparing, wherein the charging circuit is connected between the mains and the intermediate DC circuit bypassing the rectifier bridge, whereby the elevator motor is permanently connected to the converter bridge of the motor drive, wherein before closing the controlled main relay, a charging switch of the charging circuit is closed and a voltage of the intermediate DC circuit or a voltage over the current limiting component of the charging circuit is measured, and that the controlled main relay is closed only if a measured voltage over the current limiting component is below at least one reference value or if the voltage of the intermediate DC circuit exceeds at least one reference value.

14. Method according to claim 13, wherein already before closing the charging switch the voltage in the intermediate DC circuit is measured and the charging switch is prevented from being closed if the voltage exceeds said at least one reference value.

* * * * *